United States Patent [19]
van Pottelsberghe de la Potterie

[11] 3,716,380
[45] Feb. 13, 1973

[54] BEEF FLAVOR

[75] Inventor: Pierre Joseph van Pottelsberghe de la Potterie, Columbus, Ohio

[73] Assignee: Societe D'Assistance Technique pour Produits Nestle SA, Lausanne, Switzerland

[22] Filed: Oct. 6, 1970

[21] Appl. No.: 78,591

[52] U.S. Cl. ............................................. 99/140 N
[51] Int. Cl. ............................................. A23l 1/26
[58] Field of Search ........................ 99/140 R, 140 N

[56] References Cited

UNITED STATES PATENTS

| 3,394,017 | 7/1968 | Giacino | 99/140 R |
| 3,480,447 | 11/1969 | Hack et al. | 99/140 R |
| 3,493,395 | 2/1970 | Soeters | 99/140 R |
| 3,524,747 | 8/1970 | O'Hara et al. | 99/140 N |
| 3,532,515 | 10/1970 | Broderick et al. | 99/140 N |

Primary Examiner—Morris O. Wolk
Assistant Examiner—Warren Bovee
Attorney—Watson, Leavenworth & Kelton

[57] ABSTRACT

A beef flavoring agent is obtained by reacting a protein hydrolysate, methionine and a saccharide, optionally in the presence of a carboxylic acid.

14 Claims, No Drawings

BEEF FLAVOR

This invention is concerned with novel flavoring substances having a flavor and aroma similar to roasted beef.

It is generally believed that the development of the basic meaty flavor common to all meat is produced by non-enzymatic browning of the precursors present in the water-soluble fractions of fresh meat.

Various materials having the flavor and aroma of roasted meats are described in the literature, and the preparation of these substances is essentially based on the Maillard reaction which takes place when amino acids or proteinaceous substances are heated in the presence of mono or polysaccharides. The heating causes browning of the reactants accompanied by the development of aromatic components.

A particular role in flavor development has been ascribed to cystine, cysteine or peptides containing these amino acids, but other amino acids such as phenylalanine and methionine have been excluded from the reaction as they are believed to give rise to undesirable flavors.

Despite the voluminous literature which exists in this field, no really satisfactory meat flavors have apparently been produced.

An object of the present invention is to provide a flavoring agent having a strong and characteristic roast beef flavor and aroma.

Another object of the invention is to provide a flavoring agent superior in flavor and keeping quality to substances prepared from cystine or cysteine.

A further object of the invention is to provide a roast beef flavoring material which can be prepared from readily available starting materials.

In accordance with the invention, a flavoring agent is prepared by controlled reaction of a mono or polysaccharide with methionine in the presence of a protein hydrolysate free of cystine or cysteine. The reaction is performed in an aqueous medium, containing, for example, water in the amount corresponding to one to four times the total weight of solid reactants.

The principal starting material is a protein hydrolysate obtained, for example, by acid hydrolysis of a vegetable protein followed by neutralization. Such hydrolysates may be obtained from various proteinaceous materials, for example wheat germ, corn gluten, soy protein, linseed protein, peanut press cake and the like. Typical preferred vegetable protein hydrolysates contain 25 to 35 percent of amino acids, with no cystine or cysteine. Apart from vegetable proteins, hydrolysates of animal or fish proteins may also be used.

The monosaccharide should preferably be a pentose such as ribose, xylose or arabinose, or a hexose such as glucose. A mixture of mono and polysaccharides may also be used as starting material, and this may conveniently be provided in the form of an acid hydrolysate of a carbohydrate material such as coffee chaff, oats, rye or barley, and particularly of spent coffee grounds (obtained as a by-product in the manufacture of coffee extract). The hydrolysate may be prepared by heating these materials with about 3 percent of concentrated sulphuric acid for 6 to 10 hours, preferably at reflux temperature. The resulting hydrolysate contains about 5 to 15 percent of monosaccharide. It has, surprisingly, been found that such hydrolysates may be reacted directly with a protein hydrolysate, in the absence of methionine, to provide beef-flavored products.

The reaction leading to the formation of the flavoring agent should preferably be effected by heating the reactants in water for about 2 to 3 hours, desirably under reflux at the boiling temperature of the reaction medium which is about 90° to 100° C. The reaction medium may contain up to about 80 percent of water, and usually about 60 to 75 percent.

Preferred compositions may be prepared by reacting a mixture of 20 to 40 parts by weight of protein hydrolysate, 0.09 to 1.5 parts by weight of methionine (either isomer), about 0.5 to 6.0 parts by weight of saccharide suspended in water. When a hydrolysate of a carbohydrate material is used as saccharide source, this reactant may be present in the medium at a level of 2 to 12 parts by weight, the amount of protein hydrolysate being within the limits given.

In addition to the principal reactants (protein hydrolysate, methionine and saccharide), the reaction medium may also contain minor amounts of a carboxylic acid which, it has been found, confers desirable flavor notes to the product. Lower carboxylic acids, such as lactic, malic or succinic acid, as well as fatty acids (e.g. palmetic, stearic or oleic acid) may be used, either singly or as mixtures, preferably at a total level between about 0.3 and 3.0 percent by weight of the reaction medium. One or more 5'-nucleotides, such as sodium inosinate or sodium guanylate, may also be added, in an amount between 0.3 and about 1 percent by weight of the medium. Alternatively, the nucleotide may be added to the product after reaction.

Specific flavor notes may be obtained by addition of yeast autolysate, either to the reactants prior to heating or to the finished product. It has been found that particularly preferred beef flavorings are obtained when the quantity of yeast added corresponds to 20 to 50 percent of the protein hydrolysate.

The flavoring agent may be provided in liquid, paste or dry form, the reaction medium being concentrated and/or dried by conventional methods. No separate isolation step is necessary, and the final product is water-soluble and has a strong beef flavor.

The invention is illustrated by the following examples, in which the parts and percentages are by weight.

EXAMPLE 1

The following substances are refluxed at about 100° C. for 2½ hours with stirring:

| | |
|---|---|
| Hydrolysed plant protein (cysteine-free) | 22.0 parts |
| Sodium guanylate | 0.64 |
| Malic acid | 0.38 |
| Methionine | 0.31 |
| Xylose | 0.57 |
| Water | 76.10 |

After reaction the product is vacuum dried, providing 23 parts of a brown powder having the flavor of roast beef. The sodium guanylate may alternatively be added to the dry powder rather than to the reaction medium.

EXAMPLE 2

The following substances are heated at about 100° C. under reflux for 3 hours:

| | |
|---|---|
| Hydrolysed plant protein (cysteine-free) | 26.55 parts |
| Sodium guanylate | 0.47 |
| Lactic acid | 0.28 parts |
| Palmitic acid | 0.47 |
| Succinic acid | 0.19 |
| Methionine | 0.28 |
| Xylose | 0.71 |
| Water | 71.07 |

After reaction the product is concentrated to a paste containing 45 percent solids and may be used directly as a beef flavoring for various foodstuffs.

EXAMPLE 3

The following substances are refluxed for 2½ hours:

| | |
|---|---|
| Hydrolysed plant protein (cysteine-free) | 28.95 parts |
| Stearic acid | 0.44 |
| Sodium inosinate | 0.22 |
| Sodium guanylate | 0.22 |
| Hydrolysed spent coffee grounds | 4.38 |
| Water | 65.79 |

The resulting product is vacuum dried and is particularly suitable for imparting a beef flavor to soups and gravies.

If the stearic acid is omitted a slightly less mild-flavored product is obtained. The inosinate and guanylate may alternatively be blended with the dried product after reaction. Their presence is desirable as these substances confer a pleasant mouthfeel to the finished flavoring.

EXAMPLE 4

Three beef flavors are prepared by refluxing the listed ingredients for about 2½ hours:

| | A | B | C |
|---|---|---|---|
| Hydrolysed plant protein * (cysteine free) | 18.61 | 18.54 | 18.54 parts |
| Autolysed yeast | — | 5.93 | — |
| Methionine | 0.09 | — | 0.22 |
| Xylose | 0.55 | 0.64 | 0.74 |
| Water | 74.43 | 74.15 | 74.18 |

* Obtained from 60/40 mixture of corn gluten and wheat germ.

After reaction the water is evaporated and the residues are dried. The resulting powders have good beef flavor. Particular flavor notes may be obtained by adding 0.37 parts of a 5'-nucleotide mixture to the dry flavoring. Yeast autolysate (about 6 parts) may be added to compositions A and C.

I claim:

1. A water soluble beef flavoring agent produced by a process which comprises reacting together, by heating in an aqueous medium, a mixture comprising about 20 to 40 parts by weight of vegetable protein hydrolysate essentially free of cystine and cysteine, about 0.09 to 1.5 parts by weight of methionine and about 0.5 to 6 parts by weight of saccharide, the amount of water present in the medium being about 1 to 4 times the total weight of solids.

2. A product according to claim 1 in which the reaction medium also contains a carboxylic acid selected from the group consisting of lower carboxylic acids and fatty acids.

3. A product according to claim 1 in which the reaction medium contains about 0.3 to 3.0 percent by weight of a carboxylic acid selected from the group consisting of lactic, malic, succinic, palmitic, stearic and oleic acids.

4. A product according to claim 3 in which the saccharide is xylose.

5. A product according to claim 4 in which upon completion of the reaction the flavoring agent is recovered in powdered form by removing the water from the medium.

6. A product according to claim 1 in which the reaction medium contains autolyzed yeast in an amount corresponding to 20 to 50% of the protein hydrolysate.

7. A product according to claim 1 in which the saccharide is xylose.

8. A product according to claim 1 in which upon completion of the reaction the medium is concentrated to provide the flavoring agent in paste form.

9. A water soluble beef flavoring agent produced by a process which comprises reacting together, by heating in an aqueous medium a mixture comprising about 20 to 40 parts by weight of vegetable protein hydrolysate essentially free of cystine and cysteine and 2 to 12 parts by weight of an acid hydrolysate of a carbohydrate-containing material, the amount of water present in the medium being about one to four times the total weight of solids.

10. A product according to claim 9 in which the carbohydrate containing material is selected from the group consisting of coffee chaff, oats, rye, barley or spent coffee grounds.

11. A product according to claim 10 in which the reaction medium contains 0.3 to 3 percent by weight of a carboxylic acid selected from the group consisting of lactic, malic, succinic, palmitic, stearic and oleic acids.

12. A product according to claim 10 in which upon completion of the reaction the flavoring agent is recovered in powdered form by removing the water from the medium.

13. A product according to claim 10, in which the carbohydrate-containing material is hydrolyzed in a 3 percent aqueous solution of concentrated sulfuric acid.

14. A product according to claim 9 in which upon completion of the reaction the medium is concentrated to provide the flavoring agent in paste form.

* * * * *